(12) United States Patent
Reuvekamp et al.

(10) Patent No.: US 9,540,053 B2
(45) Date of Patent: Jan. 10, 2017

(54) METHOD FOR MANUFACTURING A MOLDED ARTICLE OF A RUBBER POLYMER TO WHICH ANOTHER ARTICLE IS DETACHABLY CONNECTED

(71) Applicant: Apollo Tyres Global R&D B.V., Enschede (NL)

(72) Inventors: Louis-Philippe Antoine Eugene Maria Reuvekamp, Enschede (NL); Gerard Nijman, Losser (NL); Bart Maria Oude Luttikhuis, Bietigheim (DE)

(73) Assignee: Apollo Tyres Global R&D B.V., Enschede (NL)

( * ) Notice: Subject to any disclaimer, the term of this patent is extended or adjusted under 35 U.S.C. 154(b) by 16 days.

(21) Appl. No.: 14/423,139

(22) PCT Filed: Nov. 15, 2013

(86) PCT No.: PCT/NL2013/050823
§ 371 (c)(1),
(2) Date: Feb. 23, 2015

(87) PCT Pub. No.: WO2014/077689
PCT Pub. Date: May 22, 2014

(65) Prior Publication Data
US 2015/0239511 A1 Aug. 27, 2015

(30) Foreign Application Priority Data
Nov. 19, 2012 (NL) ...................................... 2009835

(51) Int. Cl.
*B62D 35/00* (2006.01)
*A44B 19/02* (2006.01)
(Continued)

(52) U.S. Cl.
CPC ............... *B62D 35/00* (2013.01); *A44B 19/02* (2013.01); *B29D 5/00* (2013.01); *B62D 35/005* (2013.01);
(Continued)

(58) Field of Classification Search
CPC . B62D 35/00; B62D 35/005; Y10T 29/49826; A44B 19/02; B29D 5/00; B29K 2105/246; B29K 2023/16
(Continued)

(56) References Cited

U.S. PATENT DOCUMENTS 7,055,891 B2    6/2006   Jungert
7,150,494 B2 *  12/2006  Bangle ..................... B32B 5/24
                                                      296/180.5
(Continued)

OTHER PUBLICATIONS

International Search Report for corresponding International Application No. PCT/NL2013/050823 dated Feb. 13, 2014.

*Primary Examiner* — Pinel Romain
(74) *Attorney, Agent, or Firm* — Renner, Otto, Boisselle & Sklar, LLP

(57) ABSTRACT

The invention relates to a method for manufacturing a molded article (11) of a rubber polymer to which another article (12) is detachably connected. The method comprises the steps of providing a coupling means (2), comprising a first (2a) and second (2b) member, both of which are provided with interlocking elements (21,22) along connectable edges, the interlocking elements (21,22) being configured to interlock in a substantially continuous way along the edges in the connected state, and unlock in the disconnected state; integrating the first member (2a) and the molded article (11), such that its interlocking elements (21) are available for connection; integrating the second member (2b) and the other article (12), such that its interlocking elements (22) are available for connection; and interlocking
(Continued)

the interlocking elements (21,22) of the first and second member (2a,2b) to produce the detachable connection between the articles. The invention further relates to a vehicle spoiler (1), portions of which are mutually connected by the method of the invention.

14 Claims, 4 Drawing Sheets

(51) Int. Cl.
    *B29D 5/00*         (2006.01)
    *B29K 23/00*       (2006.01)
    *B29K 105/24*     (2006.01)

(52) U.S. Cl.
    CPC ...... *B29K 2023/16* (2013.01); *B29K 2105/246* (2013.01); *Y10T 29/49782* (2015.01); *Y10T 29/49826* (2015.01)

(58) Field of Classification Search
    USPC ................................ 296/180.1; 29/408, 428
    See application file for complete search history.

(56) References Cited

U.S. PATENT DOCUMENTS

| | | | |
|---|---|---|---|
| 8,430,447 B2 * | 4/2013 | Jungert | B62D 35/005 |
| | | | 180/903 |
| 9,096,279 B2 * | 8/2015 | Beierl | B62D 35/007 |
| 2011/0239415 A1 | 10/2011 | Zezza | |
| 2012/0013145 A1 | 1/2012 | Jungert et al. | |

* cited by examiner

METHOD FOR MANUFACTURING A MOLDED ARTICLE OF A RUBBER POLYMER TO WHICH ANOTHER ARTICLE IS DETACHABLY CONNECTED

This application is a national phase of International Application No. PCT/NL2013/050823 filed Nov. 15, 2013 and published in the English language, which claims priority to Application No. NL 2009835 filed Nov. 19, 2012.

The invention relates to a method for manufacturing a molded article of a rubber polymer to which another article is detachably connected. The invention in particular relates to a vehicle spoiler with a movable airflow guiding element, and to a method for manufacturing such a vehicle spoiler.

In many applications, articles of a rubber polymer may experience wear over time in particular areas of the article, because such areas are more heavily solicited then other article areas. Flexible bodywork elements of vehicles, such as a vehicle flexible spoiler with a movable airflow guiding element, such as disclosed in U.S. Pat. No. 7,055,891 B2 for instance, experience increased wear at areas that may contact the road. Consequently, areas of an article may be worn to an important extent while other areas of the article are substantially intact. In such case, the entire article is usually replaced while only a small area actually qualifies for replacement. This is inefficient and costly, and adds to the total amount of waste in the environment.

The present invention has for its object to provide a method for manufacturing a molded article of a rubber polymer to which another article is detachably connected. In case of wear of the other article, this article is simply disconnected from the molded article, and replaced with a virgin other article.

A vehicle spoiler comprising a movable airflow guiding element generally also comprises an actuating member configured to move the airflow guiding element relative to a part of the vehicle to which it is attached, between a retracted inoperative position and an extended operative position in which the airflow-conducting element forms an extension of the vehicle part. Such an actuating member may also experience damage to such extent that it can no longer perform its function. wherein the actuating member is detachably connected to the airflow guiding element. The invention in particular has for its object to provide a vehicle spoiler comprising an airflow guiding element and an actuating member that is detachably connected to the airflow guiding element, so that a damaged actuating member can be readily replaced.

According to the invention, the above objective is achieved by a method for manufacturing a molded article of a rubber polymer to which another article is detachably connected, the method comprising the steps of A) providing a coupling means, comprising a first and second member, both of which are provided with interlocking elements along connectable edges, the interlocking elements being configured to interlock in a substantially continuous way along the edges in the connected state, and unlock in the disconnected state; B) integrating the first member and the molded article, such that its interlocking elements are available for connection; C) integrating the second member and the other article, such that its interlocking elements are available for connection; and D) interlocking the interlocking elements of the first and second member to produce the detachable connection between the articles.

The molded and other article may readily be disconnected by disconnecting the coupling means. In case of wear of the other article, this article is simply disconnected from the molded article by disconnecting the first and second members of the coupling means, and replacing the worn other article with a virgin other article, provided with a second member.

The molded article can be made of any rubber polymer, including thermoplastic rubber polymers, but is preferably made of a vulcanized rubber polymer or compound.

The present invention provides a method for detachably connecting a molded article of a rubber polymer to another article, such that the connection is readily detached and reattached, is strong enough to maintain the connection in normal use of the molded article, and does not change the elastic properties of the rubber molded article. The interlocking elements are hereby configured to interlock in a substantially continuous way along the edges in the connected state. With a substantially continuous connection is meant a connection that is not interrupted along the connectable edges of the members, or only for at most 10% of the connectable edges. The term "substantially" as used herein and when referred to a particular property means at least 90% of the indicated property, and more preferably at least 95% of the indicated property.

These advantages are even more pronounced in an embodiment of the invention, providing a method wherein the coupling means comprise a zip or slide fastener, the first and second member thereof comprising strips with the interlocking elements along connectable edges thereof, and a slide to interlock and unlock the interlocking elements, wherein the strips are integrated with the articles. The members of such a coupling means comprise male and female interlocking elements. Engaging the interlocking elements by sliding the slide in a closing direction connects the two members (and the articles) to each other, while disengaging the interlocking elements by sliding the slide in an opening direction disconnects the members (and the articles). This embodiment provides an easier release of the coupling means and yet a strong connection between the coupling means and the articles.

The coupling means comprising two (or more) interlockable members, may have any shape suitable for the purpose. The only requirement is that they can be integrated with the molded article and with the other article to be attached to the molded article. In an embodiment of the method according to the invention the first and second member of the coupling means are a linear, elongated body, i.e. a body having a length that is considerably larger than its width. In a preferred embodiment the length to width ratio of the coupling means exceeds 5, more preferably exceeds 10, even more preferably exceeds 20, and most preferably exceeds 25. Such a coupling means provides a strong connection between the two articles, whereby the connection between the two members, and the connection between a member and an article with which it is integrated both provide the necessary strength.

Ready attachment and detachment of the other article to the rubber molded article is achieved in an embodiment of the invention, providing a method wherein the coupling means comprise a zip or slide fastener, comprising interlocking elements and strips, providing the surfaces to be integrated with or adhered to the articles.

In another embodiment of the invention, a method is provided wherein a member is integrated with an article during molding of the article by positioning the member in a mold for the article, adding green rubber polymer to the mold, and vulcanizing the rubber polymer. This embodiment can be applied to the molded article and the first member, and likewise to the other article and the second member.

In a method wherein a member is integrated with an article during molding of the article, a preferred embodiment comprises covering the interlocking elements of a member at least in part by a shielding element during molding of the article, and removing the shielding element after molding, thereby ensuring that the integration of the member with the article is such that its interlocking elements are available for connection by interlocking with the interlocking elements of a member provided in the other article.

In another embodiment, the shielding element comprises an elongated body with a recess configured to receive the interlocking elements of a member.

Although the shielding element in these embodiments can be made by any material suitable for the purpose, a preferred embodiment of the invention provides a method in which the shielding element is made of a temperature resistant rubber polymer, such as a silicone rubber.

Another embodiment of the method in accordance with the invention comprises the step of integrated a member with an article by adhering a surface of the member to the article. This embodiment can be applied to the molded article and the first member, and likewise to the other article and the second member.

The members of the coupling means may be adhered to the articles by any method known in the art. Mechanical, physical and/or chemical bonding methods may be envisaged. Preferred is an embodiment of the method wherein adhering the surface of the member to the article is performed by adhesive bonding and/or by welding. This is particularly relevant when the other article is the actuating member of a vehicle spoiler, since such an actuator is preferably made of a polymer film.

The coupling means may in principle be manufactured from all materials known to the skilled person. It is thus possible to apply metallic coupling means. The coupling means preferably comprise an organic polymer, selected from the group consisting of polyester, polyether, polyamide, vinyl polymer, polyolefin, styrene polymer and/or thermoplastic rubber, in particular thermoplastic polyurethane. Such coupling means are particularly suitable in respect of their properties for connection to rubber polymers.

In another embodiment of the method according to the invention, the coupling means are stretchable to at least 10% strain without breaking nor loosening the connection. This has proven to be particularly beneficial in case of a vehicle flexible spoiler comprising an airflow guiding element and an actuating member detachably connected therewith. Providing coupling means in accordance with this embodiment does not influence the deformation modes of the flexible spoiler.

In another embodiment of the invention, a method is provided wherein the coupling means are made from a rubber polymer, preferably an ethylene-propylene-diene rubber polymer (EPDM). Such coupling means are more easily adhered to the rubber polymers of the articles to be connected.

It is further advantageous when the surfaces for adhesion or integration of the coupling means members to or with the molded articles are pretreated. This can in principle take place in all ways known to the skilled person. It is thus possible to roughen, sand, or degrease the surfaces, or to provide them with a primer or other pretreating agent.

The rubber compositions as applied in the method according to the invention can be prepared in a manner known to the skilled person. Any known method of mixing polymers, fillers and other additives is in principle suitable for this purpose. It is thus possible to mix the rubber composition, optionally supplemented with additives and/or other polymers if desired, using an internal mixer or Banbury mixer, a single or double-screw extruder apparatus, a blade kneader, a Buss Co-kneader, a 2-roll mill and the like. Suitable temperatures during mixing are substantially determined by the rheological properties of the relevant rubber polymer.

The rubber polymers preferably applied in the rubber composition in the method according to the invention can be selected from the known rubbers. In general these rubbers have a glass transition temperature Tg lower than −10° C., although this is not essential. Rubbers suitable for application are for instance chosen from the group of natural rubbers, isoprene rubbers, butadiene rubbers, styrene butadiene copolymer rubbers, acrylonitrile butadiene copolymer rubbers, if desired copolymerized with styrene, butadiene isoprene copolymer rubbers, chloroprene rubbers, butyl and acryl rubbers, and ethylene-propylene copolymers which, if desired, comprise a third copolymerizable diene monomer such as for instance 1,4-hexadiene, dicyclopentadiene, dicyclooctadiene, methylene norbornene, ethylidene norbornene and tetrahydroindene. If desired, the rubber composition also comprises a minor quantity of natural rubber and/or elastomer, which is preferably composed of 1,3-diene compounds such as for instance butadiene and/or isoprene and/or 2,3-dimethyl butadiene. The rubber composition applied in the method preferably comprises an ethylene-propylene rubber, and the applied rubber composition more preferably comprises an ethylene-propylene-diene rubber (EPDM). Blends of said rubber polymers are also possible.

If desired, additives can be added to the rubber composition as applied in the method according to the invention. Examples of usual additives are stabilizers, antioxidants, lubricants, fillers, dyes, pigments, flame retardants, conductive fibers and reinforcing fibers. The rubber composition can particularly also comprise an oil as additive. It is also possible to add petroleum plasticizers.

The method in accordance with the invention may be applied to any rubber molded article that needs to be detachably connected to another article. In yet another aspect of the invention, an embodiment of the method is provided wherein the molded article comprises the airflow guiding element, and the other article comprises the actuating member of a vehicle spoiler, the actuating member being configured to move the airflow guiding element relative to a part of the vehicle to which it is attached, between a retracted inoperative position and an extended operative position in which the airflow-conducting element forms an extension of the vehicle part.

The invention thus also relates to such a flexible vehicle spoiler comprising an airflow guiding element and an actuating member. The actuating member is detachably connected to the airflow guiding element by a coupling means, comprising a first and second member, both of which are provided with interlocking elements along connectable edges, the interlocking elements being configured to interlock in a substantially continuous way along the edges in the connected state, and unlock in the disconnected state. An embodiment of the vehicle spoiler wherein the coupling means comprise a zip or slide fastener is particularly preferred. The coupling means in accordance with the invention provide a strong and substantially watertight, yet detachable connection between airflow guiding element and actuating means. The coupling moreover is elastically stretchable and therefore does not show substantial hysteresis. This allows to bring back the airflow element of the flexible spoiler to its original position after deformation over its lifetime, which is an important requirement for such a spoiler.

The invention will now be further elucidated with the aid of the accompanying figures, without however being limited thereto. In the figures.

Figure 1A:
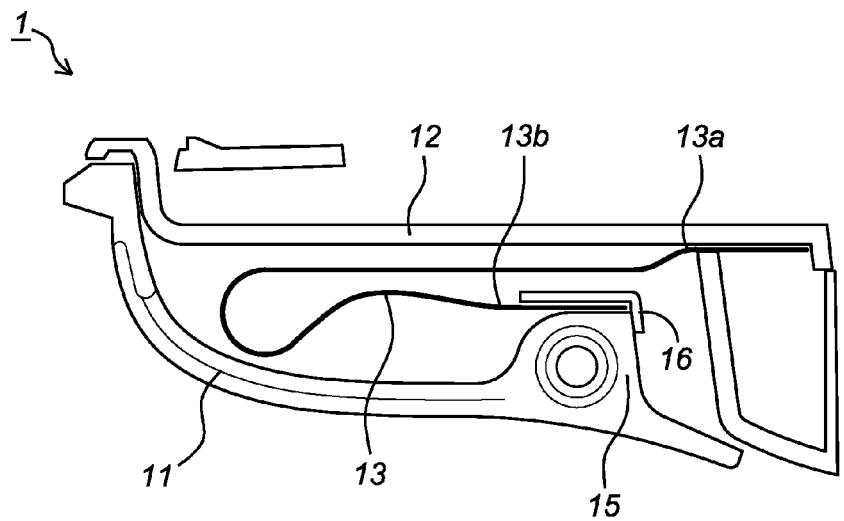
FIG. 1A shows a schematic cross-section of a flexible spoiler, comprising an airflow guiding element in the retracted position and an actuating element detachably connected thereto by an embodiment of the method according to the invention.
Figure 1B:
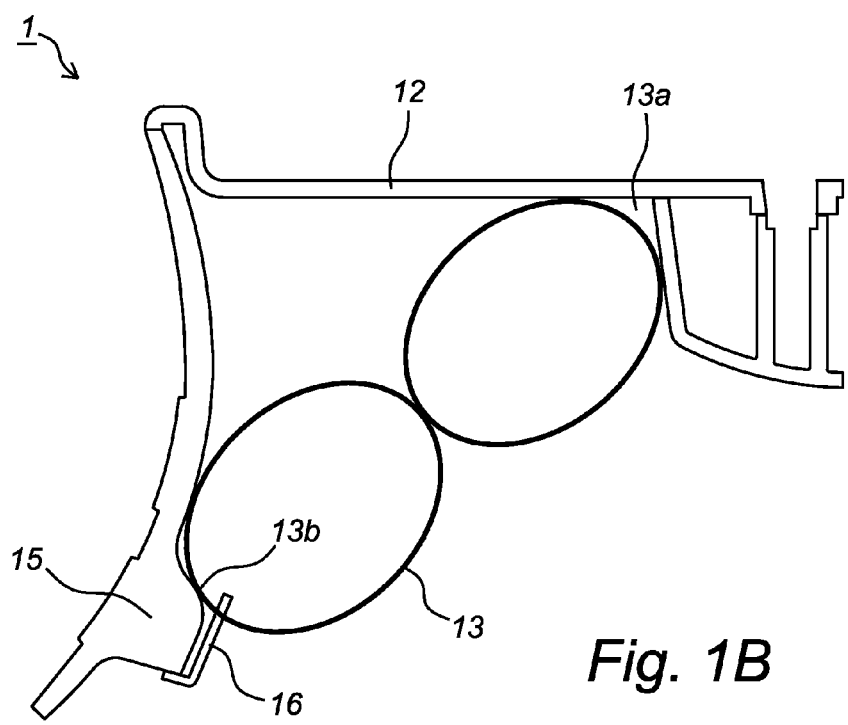
FIG. 1B shows a schematic cross-section of a flexible spoiler, comprising an airflow guiding element in the extended operative position and an actuating element detachably connected thereto by an embodiment of the method according to the invention.

FIGS. 1A and 1B more particularly show a flexible spoiler 1 for a vehicle, of which only the lower flexible part is shown. Spoiler 1 comprises an airflow guiding element 11 of a rubber polymer, a mounting member 12 for mounting spoiler 1 to the vehicle and an actuating element 13 which can move the airflow guiding element 11 between an inoperative position, shown in FIG. 1A, and an operative position, shown in FIG. 1B. The actuating element 13 is at one end 13a thereof connected to the mounting member 12 or other part of the vehicle, and at the other end 13b to the underside of the airflow guiding element 11. In FIGS. 1A and 1B, a permanent connection is shown comprising a top plate 16 that is connected to the airflow guiding element 11 and clamps the actuating element 13 against the airflow guiding element 11. The top part of the airflow guiding element 11 is connected to the mounting member 12, for instance by bonding, and the airflow guiding element 11 pivots around this connection when actuated. In the embodiment shown, the actuating member 13 takes the form of an inflatable bellows having as number of inflatable chambers and disposed on the rear side of spoiler 1. When inflatable bellows 13 is inflated, the airflow guiding element 11 moves forward from the moved-in inoperative position into the moved-out operative position. When the flexible spoiler 1 of FIG. 1 is mounted under the front bumper of a vehicle, the actuating member 13 may become damaged for some reason or another, for instance by stone impact, and when this happens with the state of the art spoiler, this would entail replacing the whole assembly.

Figure 2:
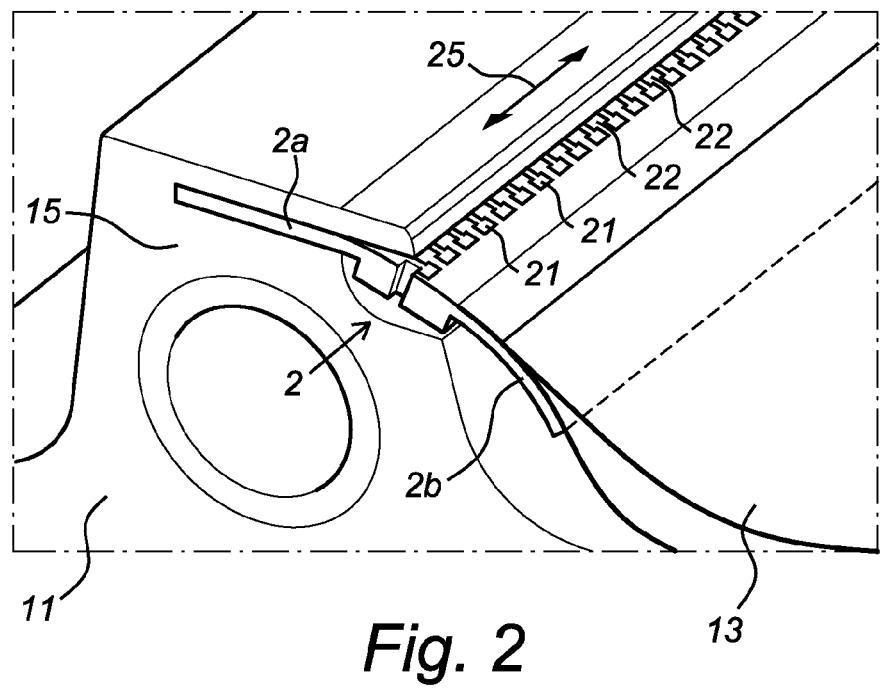
FIG. 2 shows a schematic view in perspective of the connection between the airflow guiding element of FIG. 1 and part of the actuating element, provided by an embodiment of the method according to the invention.
Figure 8:
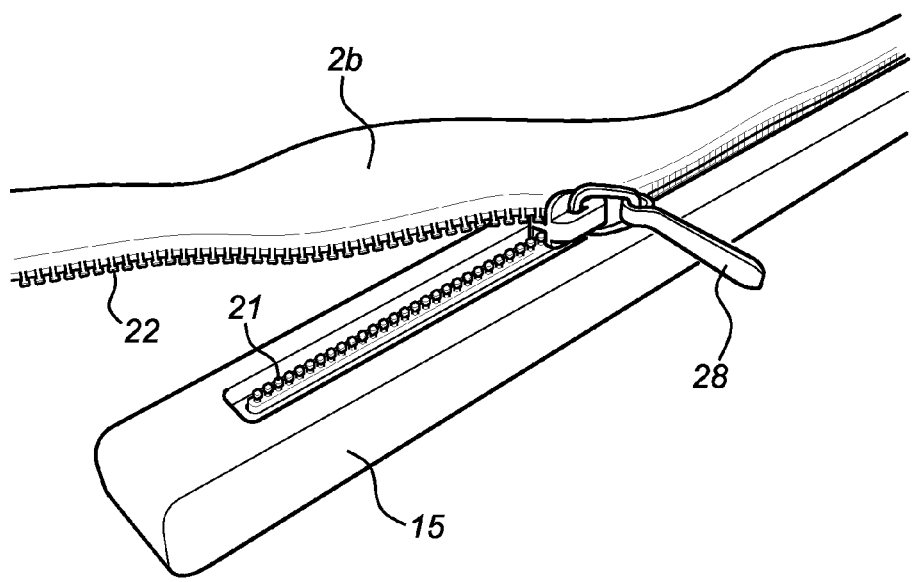
FIG. 8 finally shows a schematic view in perspective of a partly embedded coupling means in accordance with an embodiment of the invention.

As shown in detail in FIG. 2, the solution provided by an embodiment of the invention comprises providing a coupling means in the form of a zip fastener 2, comprising a first linear member (2a, 21) and a second linear member (2b, 22). The slide 28 of the zip fastener 2 is not shown in FIG. 2 (see FIG. 8). Each member is composed of tapes or strips (2a, 2b) that provide the surfaces to be adhered to or integrated with the airflow guiding element 11 (or weather strip 15) and actuating element 13 respectively, as well as interlocking elements (21, 22) positioned along connectable edges of the strips (2a, 2b). Strips (2a, 2b) may be rubber strips but are preferably made from a textile fabric, embedded in a rubber matrix. The zip fastener 2 provides a detachable connection between the airflow guiding element 11 and actuating element 13 and the connection can be achieved by interlocking the interlocking elements 21 of the first member 2a with the interlocking elements 22 of the second member 2b by sliding the slide of the zip fastener 2 in a closing direction. The connection is removed by unlocking the interlocking elements 21 of the first member 2a and the interlocking elements 22 of the second member 2b by sliding the slide of the zip fastener 2 in an opening direction. When the actuating element 13 has worn out or been damaged, it is easily replaced by disconnecting the interlocking elements (21, 22) of the zip fastener 2, removing the damaged actuating element 13 and replacing it by a virgin element 13, provided with the second member (2b, 22). It is to be noted that the connection between the actuating element 13 and the mounting member 12 at the other end 13a of the element is preferably also made detachable in accordance with an embodiment of the invention.

As shown in the embodiment of FIG. 2, the second member (2b, 22) is connected to the actuating element 13 by welding the strip 2b to the actuating element 13 at its end 13b. The invention is not limited to this method of adhering and other methods may be used. Welding is preferred since the actuating element 13 preferably comprises a polymeric film and welding is the preferred method to manufacture the actuating element 13 itself.

Figure 3:
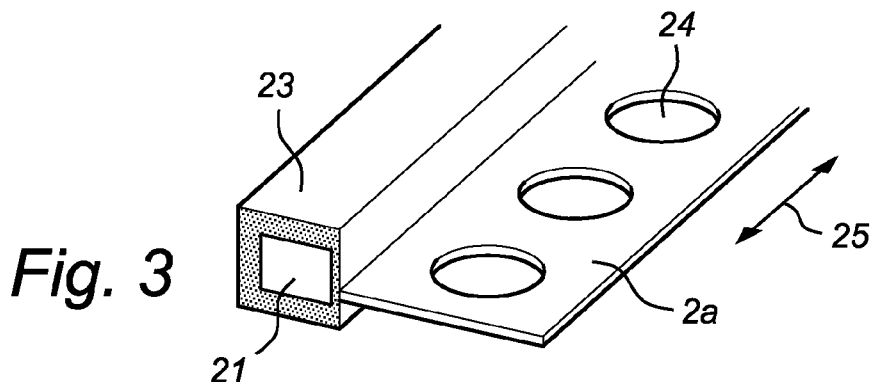
FIG. 3 shows a schematic view in perspective of a member of the coupling means, provided with a cover.

In the embodiment shown in FIG. 2, the first member (2a, 21) is connected to the actuating element 13 by integrating the strip 2a thereof with the air flow guiding element 11 during molding of the air flow guiding element 11. As shown in FIG. 3 for the first member (2a, 21), the interlocking elements 21 are covered by a shielding element 23 made of a temperature resistant rubber polymer, such as a silicone rubber, and formed as an elongated body extending in a direction 25 with a recess configured to receive the interlocking elements 21. For better connection, the strip 2a is provided a number of perforations 24 spaced in the length direction 25 of the first member (2a, 21) or shielding element 23.

Figure 4:
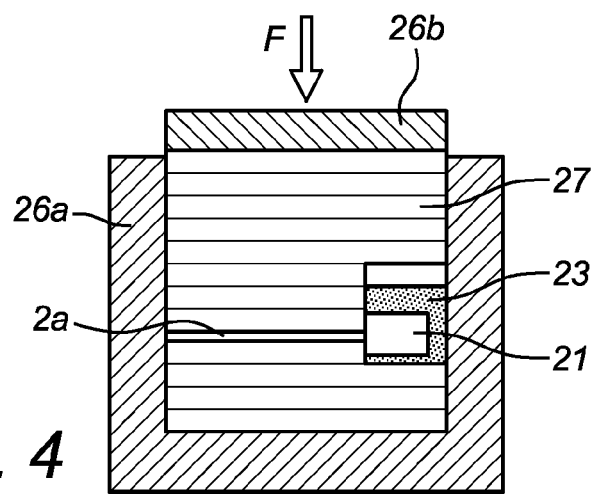
FIG. 4 shows a schematic view in cross-section of a member of the coupling means, provided with a cover; and positioned in a mold.

As schematically shown in FIG. 4, the member (2a, 21) with its interlocking elements 21 covered by the shielding element 23 is then positioned in a mold (with mold parts 26a and 26b) configured to mold (part of) the air flow guiding element 11. Layers 27 of unvulcanized rubber polymer are then added to the mold, and the rubber polymer is vulcanized under a pressure F to obtain (part of) the air flow guiding element 11 in which the member (2a, 21) is integrated. The temperature of vulcanization depends on the type of green rubber used and may vary between large ranges. In the present example, the vulcanization temperature amounts to about 105° C. After about 12 minutes the mould is opened and the assembled molded articles are removed from the mould. The assembled molded article comprises an airflow guiding element 11 of the flexible spoiler 1 attached to the first strip 2a of the first member (2a, 21).

Figure 5:
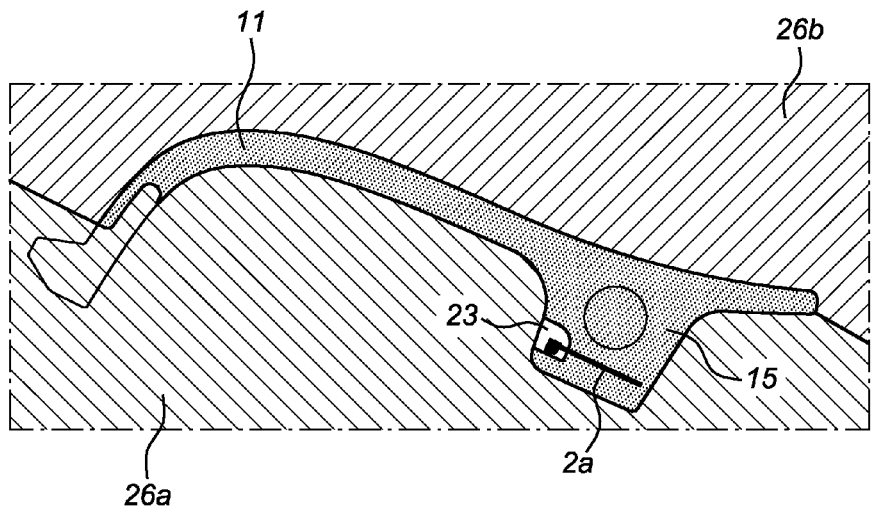
FIG. 5 shows a schematic view in cross-section of part of a spoiler lip provided with an integrated member of the coupling means, provided with a cover.
Figure 6:
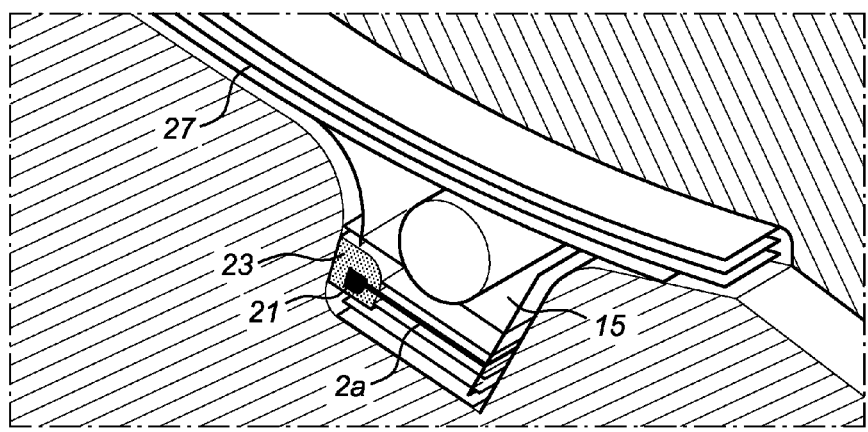
FIG. 6 shows a schematic view in perspective of part of a spoiler lip provided with an integrated member of the coupling means, provided with a cover.
Figure 7:
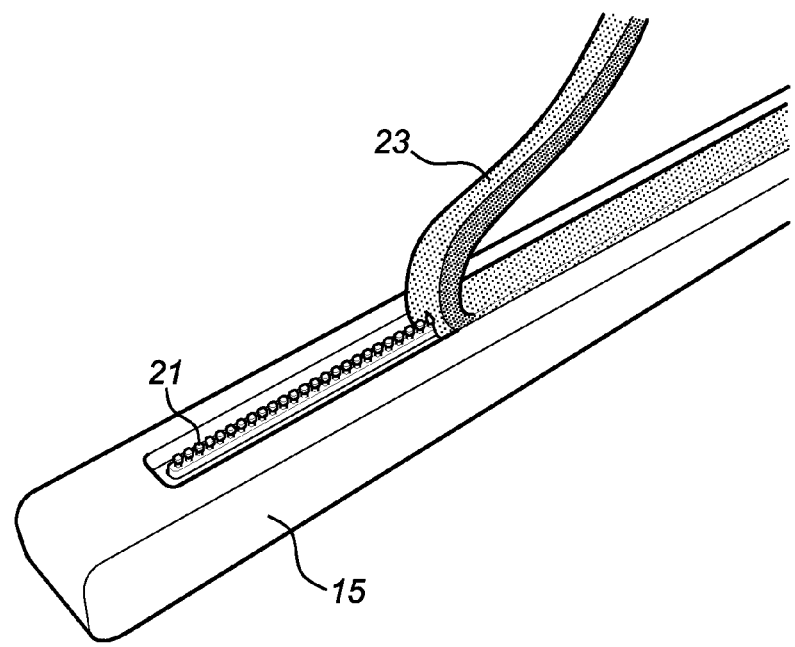
FIG. 7 shows a schematic view from above of the interlocking elements of a member of the coupling means are partly removal of the cover.

The silicone shielding element 23 is positioned such that it extends up to a free surface of the air flow guiding element 11, as shown in FIGS. 5 and 6. To make the interlocking elements 21 available for connection to the interlocking elements 22 of a second member (2b, 22), the shielding element 23 is removed after molding, as shown in FIG. 7 (please note that part 15 is not complete), which makes the interlocking elements 21 available for interlocking with the interlocking elements 22 of a second member (2b, 22) by sliding a slide 28, as conceptually shown in FIG. 8. Although not shown in FIG. 8, it will be understood that the second member (2b, 22) is meant to be connected with the actuating element 13 of the flexible spoiler 1.

The invention is not limited to detachably connecting the actuator element 13 to the air flow guiding element 11 of the spoiler 1, and other elements of the flexible spoiler 1, such as a removable bottom part for instance, may be connected to the air flow guiding element 11, or parts thereof such as the thickened weather strip 15, by the same method as described above.

The invention claimed is:

1. A method for manufacturing a molded article of a rubber polymer to which another article is detachably connected, the method comprising the steps of
    A) providing a coupling means, comprising a first and second member, both of which are provided with interlocking elements along connectable edges, the interlocking elements being configured to interlock in a substantially continuous way along the edges in the connected state, and unlock in the disconnected state;
    B) integrating the first member and the molded article, such that the interlocking elements of the first member are available for connection;
    C) integrating the second member and the other article, such that the interlocking elements of the second member are available for connection; and
    D) interlocking the interlocking elements of the first and second member to produce the detachable connection between the articles;
    wherein a member is integrated with an article during molding of the article by positioning the member in a mold for the article, adding unvulcanized rubber polymer to the mold, and vulcanizing the rubber polymer; and
    wherein integrating a member with an article such that the interlocking elements of the member are available for connection is performed by covering the interlocking elements of a member at least in part by a shielding element during molding of the article, and removing the shielding element after molding.

2. The method according to claim 1, wherein the coupling means comprise a zip or slide fastener, the first and second member thereof comprising strips with the interlocking elements along connectable edges thereof, and a slide to interlock and unlock the interlocking elements, wherein the strips are integrated with the articles.

3. The method according to claim 1, wherein the first and second member are a linear, elongated body with a length to width ratio of more than 20.

4. The method according to claim 1, wherein the shielding element comprises an elongated body with a recess configured to receive the interlocking elements of a member.

5. The method according to claim 1, wherein the shielding element is made of a temperature resistant rubber polymer.

6. The method according to claim 1, wherein a member is integrated with an article by adhering a surface of the member to the article.

7. The method according to claim 6, wherein adhering the surface of the member to the article is performed by at least one of adhesive bonding and welding.

8. The method according to claim 1, wherein one or both of the first and second member are provided with perforations at least at the surfaces to be integrated with or adhered to the respective article.

9. The method according to claim 1, wherein the coupling means comprise an organic polymer, selected from the group consisting of polyester, polyether, polyamide, vinyl polymer, polyolefin, styrene polymer and thermoplastic rubber.

10. The method according to claim 1, wherein the coupling means are stretchable to at least 10% strain without breaking nor loosening the connection.

11. The method according to claim 1, wherein the rubber polymer of at least one of the first and second article are substantially fully vulcanized.

12. The method according to claim 1, wherein the molded article comprises an airflow guiding element, and the other article comprises an actuating member of a vehicle spoiler, the actuating member being configured to move the airflow guiding element relative to a part of the vehicle to which it is attached, between a retracted inoperative position and an extended operative position in which the airflow-conducting element forms an extension of the vehicle part.

13. A vehicle spoiler comprising an airflow guiding element and an actuating member configured to move the airflow guiding element relative to a part of the vehicle to which it is attached, between a retracted inoperative position and an extended operative position in which the airflow-conducting element forms an extension of the vehicle part, wherein the actuating member is detachably connected to the airflow guiding element by a coupling means, comprising a first and second member, both of which are provided with interlocking elements along connectable edges, the interlocking elements being configured to interlock in a substantially continuous way along the edges in the connected state, and unlock in the disconnected state.

14. The vehicle spoiler according to claim 13, wherein the coupling means comprise a zip or slide fastener.

* * * * *